(No Model.)
B. F. BROWN.
LAMP STOVE.
No. 480,395. Patented Aug. 9, 1892.
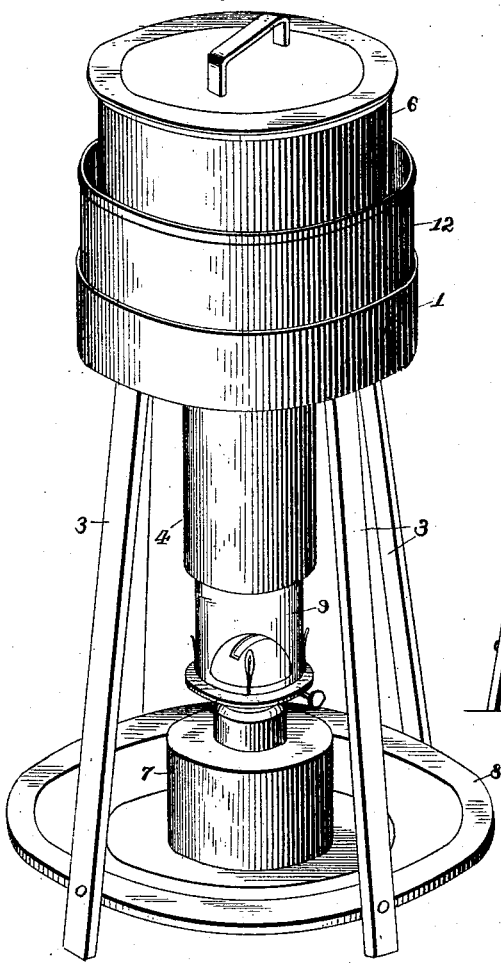
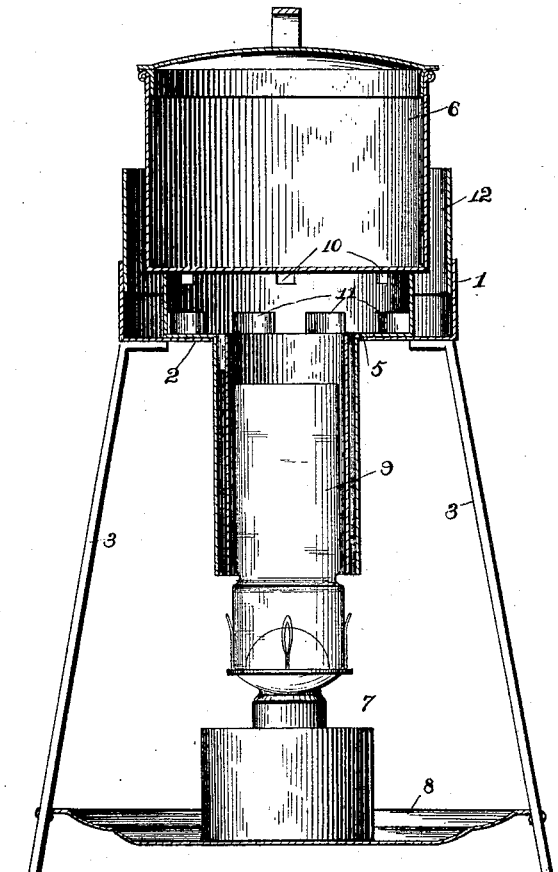
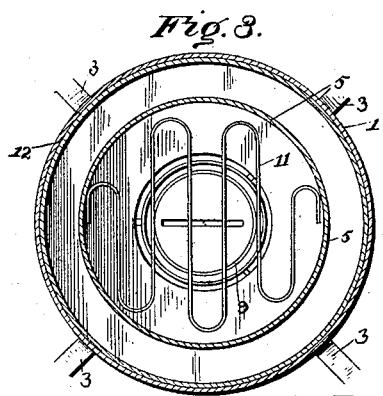
Witnesses
F. M. Johnson.
H. J. Riley
Inventor
B. F. Brown
By his Attorneys,
C. A. Snow & Co.

UNITED STATES PATENT OFFICE.

BENJAMIN F. BROWN, OF BLACKSTONE, KANSAS.

LAMP-STOVE.

SPECIFICATION forming part of Letters Patent No. 480,395, dated August 9, 1892.

Application filed February 20, 1892. Serial No. 422,283. (No model.)

*To all whom it may concern:*

Be it known that I, BENJAMIN F. BROWN, a citizen of the United States, residing at Blackstone, in the county of Sumner and State of Kansas, have invented a new and useful Lamp-Stove, of which the following is a specification.

The invention relates to improvements in lamp-stoves.

The object of the present invention is to provide a simple and inexpensive lamp-stove on which articles may be readily heated, kept warm, and cooked.

The invention consists in the construction and novel combination and arrangement of parts hereinafter fully described, illustrated in the accompanying drawings, and pointed out in the claims hereto appended.

In the drawings, Figure 1 is a perspective view of a lamp-stove constructed in accordance with this invention. Fig. 2 is a central vertical sectional view. Fig. 3 is a horizontal sectional view.

Like numerals of reference indicate corresponding parts in all the figures of the drawings.

1 designates a cylindrical body having a flat bottom 2 and supported by legs 3 and provided in its bottom with a central circular opening, through which depends a cylindrical double-walled extension 4 of a cylindrical support 5, which is arranged within the body 1 and is adapted to hold a vessel 6 to be heated. A lamp 7 is supported on a pan 8, arranged within the legs and secured to the same at a point slightly above their lower ends, and the chimney 9 of the lamp extends within the cylindrical extension, up which the heat and products of combustion from the lamp pass. The cylindrical support is provided at its upper edge with recesses 10, through which the heat passes after warming the bottom of the vessel 6, and the sides of the cylindrical body 1 prevent the escape of the heat after leaving the support and cause the heat to warm the sides of the vessel. Arranged within the cylindrical support 5 is a supplemental support 11, which consists of a strip of metal doubled successively on itself, as shown, and the supplemental support is adapted to form a rest for the depressed portion of the bottom of a kettle or the like.

The body 1 is provided with a removable upper section 12, adapted to be detached to decrease the height of the body when it is desirable to heat a vessel of a size too great to enter the body 1.

The double-walled cylindrical extension 4 of the support 5 forms an annular air-space within it, and it is adapted to utilize the heat from the lamp to a greater extent than would be the case were the extension to consist of only one tube instead of concentric tubes, as shown. By constructing the cylindrical support and its depending extension separate from the body 1 a lamp-chimney may be readily fitted in the extension by simply lifting the latter and placing it over the chimney.

The lamp-stove is simple and inexpensive in construction and is adapted for keeping articles warm, for heating water, and for some light cooking, and its various uses will readily suggest themselves.

What I claim is—

1. A lamp-stove comprising a cylindrical body having a flat bottom with a hole therein, legs supporting the body, a cylindrical support arranged within the body and having a cylindrical extension arranged within the hole of the body and depending therefrom, and a lamp supported beneath the body and having its chimney arranged within the extension, substantially as described.

2. A lamp-stove comprising a cylindrical body having a flat bottom with a hole therein, legs supporting the body, a cylindrical support arranged within the body and provided with a depending extension arranged within the hole and consisting of concentric tubes, and a lamp supported beneath the body and having its chimney arranged within the extension, substantially as described.

3. A lamp-stove comprising a cylindrical body provided with a removable upper section and having a flat bottom with a hole therein, legs supporting the body, a cylindrical support arranged within the body and having a depending cylindrical extension arranged in said hole, a supplemental support arranged within the cylindrical support and consisting of a strip of metal successively doubled on itself, and a lamp supported beneath the body and having its chimney arranged within the extension, substantially as described.

In testimony that I claim the foregoing as my own I have hereto affixed my signature in the presence of two witnesses.

BENJAMIN F. BROWN.

Witnesses:
   JOHN S. BROWN,
   D. W. HOGAN.